(No Model.) 4 Sheets—Sheet 1.
H. G. BEATLEY.
APPARATUS FOR TREATING PIPES AND SIMILAR MATERIALS.
No. 377,597. Patented Feb. 7, 1888.
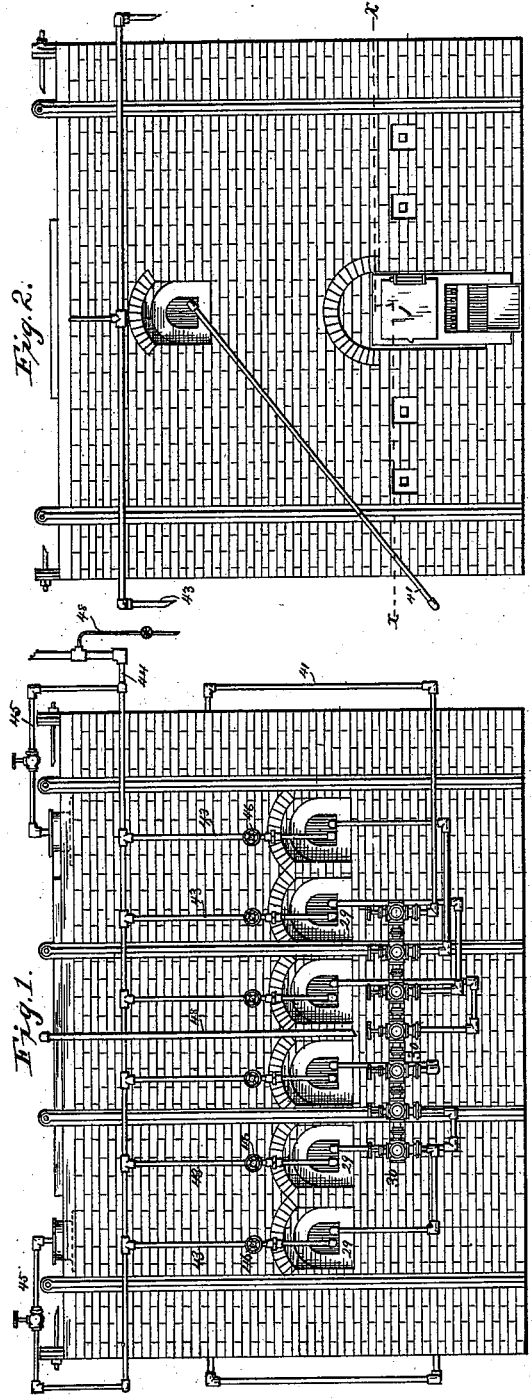
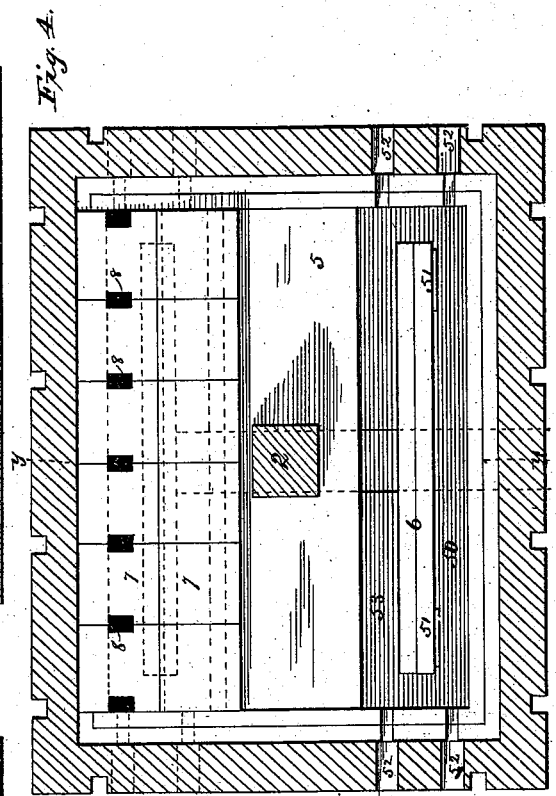
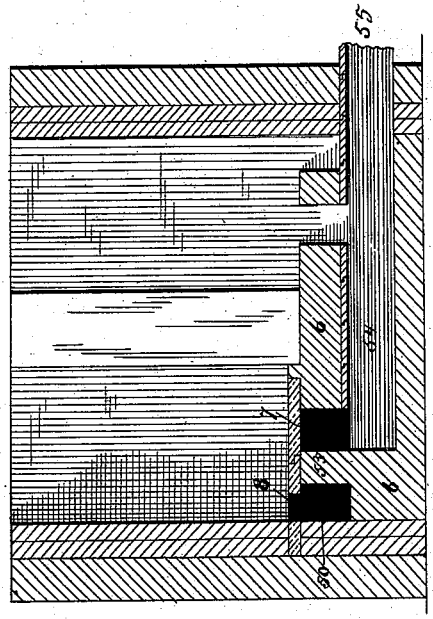
Witnesses.
Chas. R. Burr.
Sidney L. Johnson.
Inventor.
Henry G. Beatley
by Foster & Freeman
his Attorneys.

(No Model.) 4 Sheets—Sheet 2.

H. G. BEATLEY.
APPARATUS FOR TREATING PIPES AND SIMILAR MATERIALS.

No. 377,597. Patented Feb. 7, 1888.

Witnesses.
Chas. R. Burr.
Sidney L. Johnson

Henry G. Beatley
Inventor.
by Foster & Freeman
his Attorneys.

(No Model.) 4 Sheets—Sheet 3.
H. G. BEATLEY.
APPARATUS FOR TREATING PIPES AND SIMILAR MATERIALS.
No. 377,597. Patented Feb. 7, 1888.

(No Model.) 4 Sheets—Sheet 4.
H. G. BEATLEY.
APPARATUS FOR TREATING PIPES AND SIMILAR MATERIALS.
No. 377,597. Patented Feb. 7, 1888.
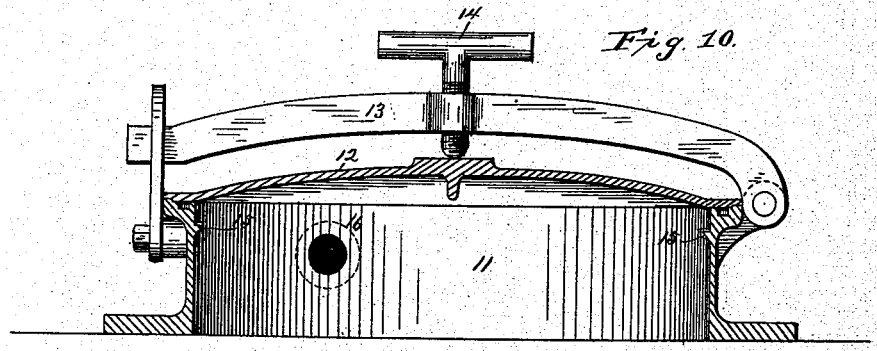
Fig. 10.
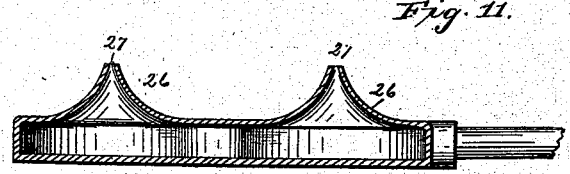
Fig. 11.
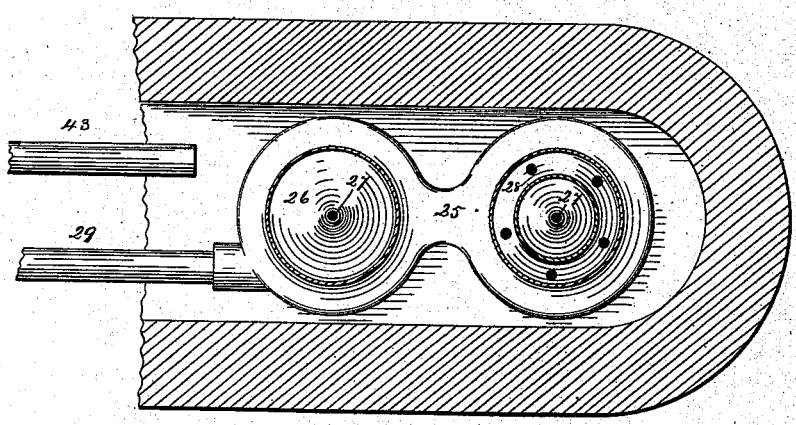
Fig. 12.
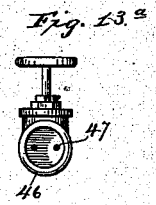
Fig. 13.ª
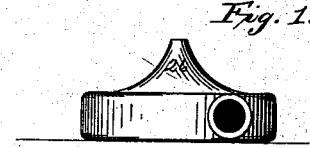
Fig. 13.
Witnesses.
Chas. R. Bull
Sidney L. Johnson
Henry G. Beatley
Inventor.
by Foster & Freeman
his Attorneys.

UNITED STATES PATENT OFFICE.

HENRY G. BEATLEY, OF ITHACA, NEW YORK.

APPARATUS FOR TREATING PIPES AND SIMILAR MATERIALS.

SPECIFICATION forming part of Letters Patent No. 377,597, dated February 7, 1888.

Application filed June 7, 1887. Serial No. 240,565. (No model.)

*To all whom it may concern:*

Be it known that I, HENRY G. BEATLEY, of Ithaca, Tompkins county, and State of New York, have invented certain new and useful Apparatus and Machinery for the Purpose of Handling and Treating Metal Pipes, Fittings, and Connections; and I do hereby declare that the following is a full, clear, and exact description thereof, which will enable others skilled in the art to which my invention pertains to make and use the same, reference being had to the accompanying drawings, and to the letters of reference marked thereon, which form part of this specification.

Figure 3:
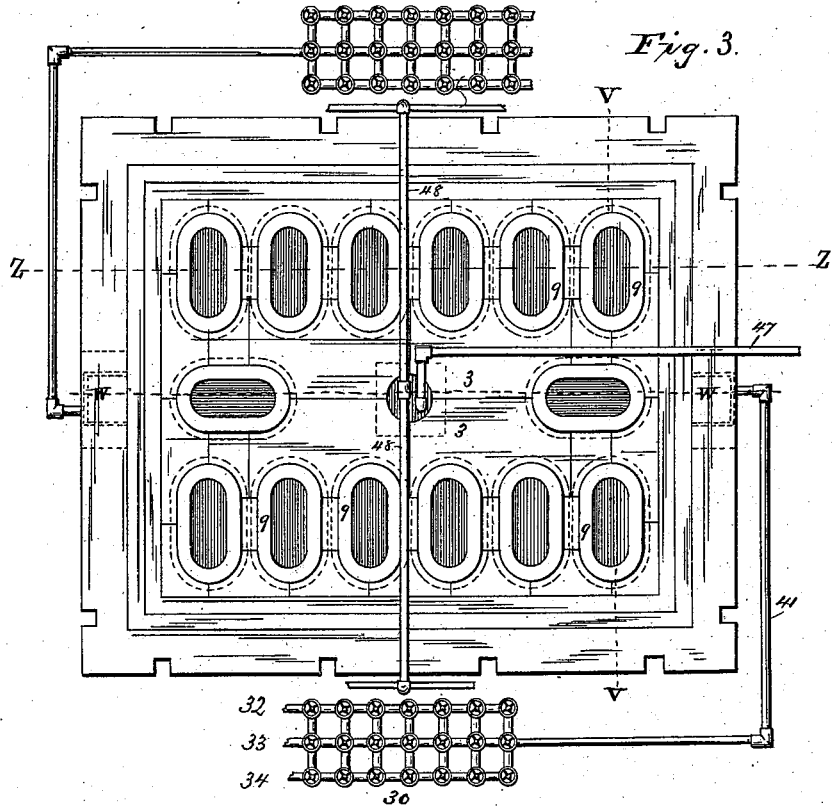
Figure 6:
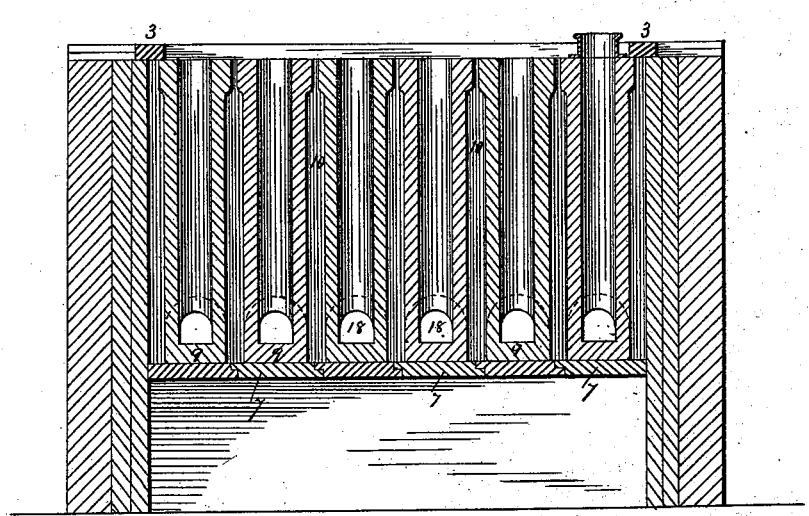
Figure 7:
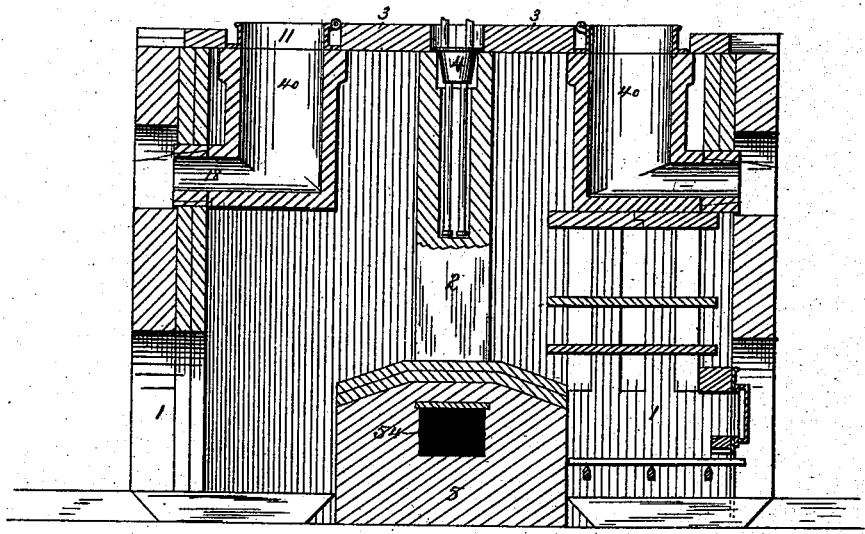
Figure 8:
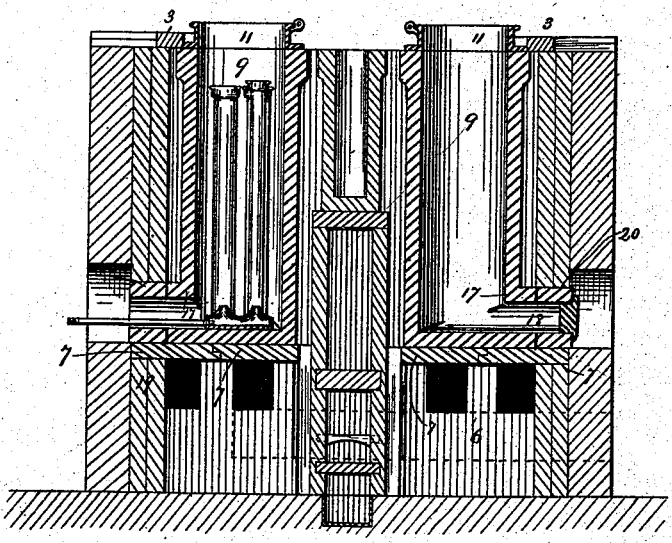
Figure 9:
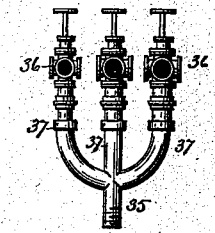

Figure 1 is a front elevation. Fig. 2 is an end elevation of the furnace embodying my invention. Fig. 3 is a plan view. Fig. 4 is a horizontal section on the line $x\ x$, Fig. 2. Fig. 5 is a vertical section on the line $y\ y$, Fig. 4. Fig. 6 is a vertical section on the line $z\ z$, Fig. 3. Fig. 7 is a vertical section on the line $w\ w$, Fig. 3. Fig. 8 is a vertical section on the line $v\ v$, Fig. 3. Fig. 9 is a detail of the nest of valves of the valve-table. Fig. 10 is a sectional view of the mouth-piece of one of the muffles. Figs. 11, 12, and 13 are respectively sectional, plan, and end views of the distributer. Fig. 13$^a$ is a detail view of the valve.

My said inventions and improvements consist, substantially, of a furnace containing air-tight muffles or retorts, in which the articles or materials to be treated are placed and sealed, and of a system of pipes, conduits, heaters, superheaters, doors, conveyers, and other apparatus to be used in connection therewith.

While the principles of construction and arrangement of my invention may be embodied in various forms and carried out by various details without departing therefrom, I will now proceed to describe the embodiment of my invention which I have shown in the accompanying drawings, and which illustrates one form of apparatus which I have found exceedingly useful and practicable in carrying out my invention.

I shall describe my invention more particularly as adapted to the handling and treatment of cast-iron pipes and connections and similar iron manufactures; but of course it will be understood that the details of construction and arrangement will be varied to adapt the invention to the handling and treatment of different articles in substantially the same manner.

The device illustrated consists, essentially, of a furnace or a bench or stack of furnaces containing retorts or muffles built of proper material, such as fire-brick and tile, with the necessary walls, piers, flues, connections, &c., set upon a properly-constructed foundation, the whole supported and held together by proper means, as buck-staves and rods.

The bench here shown is heated by two furnaces, 1 1, which may be of any ordinary construction, and are provided with suitable tile-lined doors, bearing, clinker and grate bars, and with air-inlets, &c., which need not be specifically described, being well understood by those skilled in the art. These furnaces are shown arranged on opposite ends of the bench, which latter is rectangular in shape, and in the center of the bench is formed a pier, 2, which serves as a support for the covering-tile 3 and also for the reception of the superheater 4, hereinafter referred to.

The base of the pier 5 is provided with a flue, which forms a connection with the side flues in a manner hereinafter described. The said flues are formed within suitable walls, 6, and are covered with tiles 7, some of which are provided with openings 8, to permit the passage of the heat from the chamber or oven into the flues.

In the chamber or oven are arranged a series of muffles, 9, which may be of any suitable form adapted for the special purpose for which they are to be used; but, as shown in the drawings, they consist of vertical tubes or chambers of fire-clay or other suitable material arranged side by side in two rows, and resting upon the bed-tile 7, and having their upper ends thickened or flanged, so as to leave openings 10 around each muffle for the passage of the heat. These muffles are covered with suitable mouth-pieces, 11, having a lid, 12, provided with suitable securing devices, as a cotter-bar, 13, and screw 14, whereby a tight closure of the muffle may be effected. This mouth-piece may be secured to the top of the muffle by bolts or otherwise, as desired, and the flanges of the mouth-piece are preferably made slightly smaller than the thickened ends of the muffles, so that the thickened ends of the muffle serve as a support for the covering-tile 3 of the bench. The mouth-pieces are provided with internal lugs, 15, for the reception of supporting-bars, from which the articles to be placed in the muffles may be suspended, and an outlet, 16, is also provided, which may, if desired, be used to permit the passage of the gas-vapors, air, or steam directly from the top of the muffle; or, when preferred, this outlet may be plugged, and the gases will escape through the lower portion of the muffle. The lower portions of the muffles are provided with projections 17, forming, preferably, D-shaped openings 18, which extend through the fire-brick lining 19 to the openings in the outer walls of the furnace. In order that the muffles may be readily removed from the bench without disturbing the walls, I prefer to make these extensions in two parts, one of which is joined to and forms part of the muffle itself, and may extend to or slightly into the openings in the fire-brick walls 19, the other portion, 20, being made separate and secured in the fire-brick walls and joined to the projection on the muffles by a suitable fire-clay luting or other means, producing a gas-tight joint. It will thus be seen that, if it becomes necessary, for any reason, to remove one or more of the muffles, this luting joint can be separated and the short portion removed through the opening in the outside wall, while the muffle itself may be raised up out of the bench through the opening in the top thereof without disturbing in any manner the regular set of the rest of the apparatus. This is an important feature in my invention, as it will be seen that repairs or changes may be readily made at slight expense and without disturbing in any manner the general arrangement of the bench. These projections of the muffles are closed by suitable stoppers, which may be luted or otherwise secured therein to form a gas-tight joint, and provided with suitable openings for the passage of the pipes leading to or from the gas-distributer in the muffles.

Arranged in each of the muffles, and resting upon the lower portion thereof, is a gas-distributer, 25, which is shown as consisting of a hollow chamber having two conical extensions, 26, on the top thereof. These extensions are provided with outlets 27 at the tip of the cone for the passage of gas, air, steam, or other vapors. If the apparatus is used for pipes, the pipes are placed in the muffles in a vertical position, with one of their open ends resting upon the gas-distributer, and the conical projection tends to center the pipe thereon, so that the air, gases, or other vapors passing through the outlets 27 will be evenly distributed on all sides of the pipe. I have found that I can also treat a number of pipes of different sizes at the same time, and to do this I nest said pipes, as shown in Fig. 8, and the conical projections 26 tend to cause said pipes to arrange themselves symmetrically within each other, and to cause the gases or vapors to pass in contact with all portions of the nest of pipes I provide the conical projections 26 with one or more series of openings, 28, arranged between the pipes resting thereon.

The gases or vapors are supplied to the gas-distributer through the pipes 29, which pass through the stoppers of the muffles and connect outside of the bench to what I term a "valve-table," 30. This valve-table is arranged in any convenient position outside the bench, as shown in Fig. 1, and it consists of a number of valves and connections arranged to receive the various gases or vapors through the pipes 32 33 34, and to convey said gases or vapors separately and independently to the outlet-pipes 35, which are connected to the pipes 29, leading to the gas-distributer. Suitable valves, 36, are arranged in the branches 37, which connect the outlet 35 with the various inlet-pipes 32 33 34; and it is evident that these valves can be so adjusted as to allow any desirable gas or vapor, in coming through any one of the pipes 32 33 34, to pass into any one of the outlet-pipes 35 connected to each separate muffle, so that at the same time, if it is desirable, different gases or vapors may be passed into the different muffles; or combinations of different gases or vapors may be allowed to pass into any one or all of the muffles at pleasure.

In order to utilize all the space of the bench, I arrange short muffles 40 over the fire-boxes at each end of the bench, and these muffles are provided with stoppers and projections 18, as in the case of the larger muffles, and as I generally use these small muffles for the treatment of pipe-connections and the like, or other articles of varying shape and configuration, I find it desirable to dispense with the gas-distributer heretofore described, and I pass the various gases through the stoppers of the muffles by means of the pipe 41, which is connected with the valve-table, as shown in Fig. 3.

The gases or vapors in the muffles, as before stated, may pass through the opening 16 in the mouth-piece thereof; or, if desired, they may be caused to pass down to the lower portion of the muffles, around the articles confined therein, and out through the purge-pipes 43, which are provided with suitable valves and connected to the circulating purge-pipe 44, the purge-pipes 45, provided with suitable valves, being connected with the said circulating purge-pipe and the opening 16 in the mouth-piece. The circulating purge-pipe 44 is carried to any desired point where the gases or vapors may be conveniently discharged, and to maintain a constant circulation of the gases or vapors, in a manner hereinafter described, I provide the purge-pipe with a jet, 48, which may be connected to any suitable source of air or steam pressure.

I have found it desirable to provide means for a continuous circulation of the air or vapors through the muffles under all circumstances; and while this could be done by suitably adjusting the valves 46 in the purge-pipes 43, it has been found practically impossible to adjust the valves so as to permit the escape of the desired quantity of gases or vapors, as it is impracticable to set the valve at precisely the right point. To overcome this difficulty I provide the valves 46 with openings 47, so that when the valves are seated to close the same there will still be a passage for the escape of the gases through the openings 47, and the purge-pipes 43 and the circulating purge-pipe 44, and the jet operates to produce the desired vacuum in the pipes, so that the gases or vapors in the lower part of the muffles will be continuously discharged to some extent, whether the valves 46 are opened or not, and a continuous circulation of the gases obtained. It will be understood that when it is desired to completely discharge the muffles of the gases the valves 46 are opened, so that the discharge will be rapid; but, as before stated, even when the discharge has taken place, it is desirable to keep up a slight circulation of the gases or vapors in the muffles. This is effected by the means just described, which permit a small amount of the gases or vapors to be drawn into the purge-pipe and discharged into the air.

When it is desired to use superheated steam in the apparatus, I have found it convenient to locate the superheater 4 in the pier 2, where the heat from both furnaces is utilized without waste to raise the temperature of the steam in the superheater. The superheater is connected to one of the inlet-pipes, as 33, of the valve-table by means of a pipe, 48, and a pipe, 47, leads to the superheater from any suitable source of steam. (Not shown.)

In order that the heat from the furnaces may be utilized to the best advantage in heating the oven and the muffles contained therein uniformly in all parts, I have provided certain flues controlled by dampers, so that the heat can be regulated and directed to different parts of the oven to maintain an even temperature throughout. In the arrangement shown, the products of combustion pass from the furnaces 1 into the chamber or oven and circulate freely around the muffles 9 and 40 therein, and thence they pass through the openings 8 in the bed-tile 7 into a flue, 50, arranged on each side of the bench beneath the muffles. Suitable dampers, 51, are arranged in this flue, and are controlled by means of a rod, which may be passed through the clearing-holes 52 in the walls of the bench; and when it is observed that any of the muffles in any portion of the bench are being heated too little or too much with respect to the others the dampers 51 can be adjusted so that more or less of the products of combustion will pass through that portion of the bench including the muffles referred to. The products of combustion pass from the flue 50 through the flue 53, then downward into the main flue 54, through the base 5 of the pier, and thence out through the opening 55 of said flue into a suitable chimney.

What I claim as my invention, and desire to secure by Letters Patent, is—

1. The combination of a furnace or bench consisting of a number of retorts or muffles having their mouths at the top of the bench, distributers arranged in the muffles, inlet-pipes connected to the distributers, and outlet or purge pipes connected with the muffles, substantially as described, whereby the pipes to be treated may be inserted in the mouths of the muffles and rest upon the distributers therein, as set forth.

2. In a furnace or bench, the combination of a series of muffles arranged on each side of the bench in the chamber connected with the furnaces, shorter muffles, as 40, arranged between the series of muffles, also in the chamber, fire-places arranged below the shorter muffles, a series of flues arranged in the bed below the muffles communicating with the chamber, passages in the bed-tile supporting the muffles, and dampers for controlling the passage of heat through the chamber and flues and around the muffles, substantially as described.

3. A bench or furnace consisting of a bed portion containing the flues and dampers, bed-tile placed over the flues and having passages communicating between the flues and chamber above the tile, a series of muffles arranged upon the bed-tile and having their mouths at the top of the bench, a pier arranged between the muffles, and furnaces arranged in the ends of the bench communicating with the chamber, substantially as described.

4. In a bench or furnace, the combination, with the muffles, of the distributers arranged in the bottom of the muffles, said distributers being provided with conical perforated tops, substantially as described.

5. In a bench or furnace, the combination, with a series of vertical muffles, of the gas-distributers arranged in the bases of the muffles, the said distributers having conical tops provided with perforations, whereby the pipes to be treated will automatically center upon the distributer, substantially as described.

6. In a bench or furnace, the combination, with the muffles, of the distributers arranged in the bottoms of the muffles and adapted to support the pipes to be treated, and supply-pipes connected to the distributers, whereby the gases may be forced through the distributers, substantially as set forth.

7. The double gas-distributer consisting of a base having two substantially cylindrical bodies joined together and each covered with a perforated conical top, substantially as described.

8. In a bench or furnace, the combination, with the muffles, of the distributers arranged in the bottom of the muffles, a series of pipes connected to a valve-board, and a series of valves connecting said pipes with the distributer, whereby any one or more gases or vapors in said pipes may be supplied to the distributer in any desired order, substantially as described.

9. The combination, with the muffles and gas-distributers located therein, of a series of gas or vapor supply pipes, a series of valves in said pipes, connections between said valves and the exit-pipe, and pipes connecting each exit to its respective distributer, substantially as described.

10. In a bench or furnace, the combination, with the muffles, of the distributers arranged in the bottoms of the muffles and adapted to support the pipes to be treated, supply-pipes connected to the distributers, and exhaust purge-pipes connected to the muffles, the said purge-pipes being connected with a vacuum-jet, substantially as described.

11. The combination, with the muffles, of the gas-distributers arranged therein, and the purge-pipes having valves for controlling the discharge of the gases, the said valves being provided with openings, whereby when the valves are closed a passage is provided through the valves for the purpose of keeping up a constant circulation in the muffles, substantially as described.

12. A bench or furnace having a double series of muffles arranged upon opposite sides, a furnace arranged in each end, short muffles arranged above the furnaces, a central pier, a superheater arranged in the pier, gas-distributers arranged in the muffles, and a series of pipes and valves connecting with said distributers, substantially as described.

In testimony whereof I have signed my name to this specification in the presence of two subscribing witnesses.

HENRY G. BEATLEY.

Witnesses:
F. L. FREEMAN,
WM. A. HARRIES.